Oct. 31, 1967 R. L. JAMES 3,350,574

NETWORK FOR CONVERTING A DIRECT CURRENT SIGNAL INTO PULSES HAVING A FREQUENCY CORRESPONDING TO THE AMPLITUDE OF THE DIRECT CURRENT SIGNAL

Filed Jan. 11, 1965 2 Sheets-Sheet 1

INVENTOR.
ROBERT L. JAMES
BY Herbert L. Davis
ATTORNEY

INVENTOR.
ROBERT L. JAMES
BY Herbert L. Davis
ATTORNEY

United States Patent Office 3,350,574

Patented Oct. 31, 1967

3,350,574

NETWORK FOR CONVERTING A DIRECT CURRENT SIGNAL INTO PULSES HAVING A FREQUENCY CORRESPONDING TO THE AMPLITUDE OF THE DIRECT CURRENT SIGNAL

Robert L. James, Bloomfield, N.J., assignor to The Bendix Corporation, Teterboro, N.J., a corporation of Delaware Filed Jan. 11, 1965, Ser. No. 424,584
5 Claims. (Cl. 307—88.5)

ABSTRACT OF THE DISCLOSURE

A network for providing pulses at a frequency corresponding to the amplitude of a direct current input signal. The network including an amplifier for the input signal having a feedback path and a capacitor in the feedback path, together with a control device for the capacitor and operating means for the control device responsive to the amplitude of the output of the amplifier. The control device being thereby operative in one sense to render effective a charging circuit for the feedback capacitor upon a voltage level of an output signal from the amplifier being below a set value and the control device being operative in another sense to render effective a discharging circuit for the capacitor upon the voltage level of the output signal from the amplifier exceeding the set value so as to provide through periodic charging and discharging cycles of the feedback capacitor a series of pulses at the output of the amplifier having a frequency proportional to the amplitude of the direct current input signal.

This invention relates to a novel voltage to frequency converter and, more particularly, to a novel network for converting a direct current amplitude signal into a pulse-frequency signal in such a manner that there is provided at the output of the network a series of pulse signals having a frequency which is proportional to the amplitude of the direct current signal applied at the input to the network.

An object of the invention is to provide, in combination with a conventional integrator circuit utilizing an operational amplifier having a negative feedback capacitor, the novel provision of a discharge and resetting device for a charging circuit for the feedback capacitor controlled in response to an inverted output signal from the amplifier so as to provide, through a periodic discharging and resetting of the charging cycle of the feedback capacitor, a series of output pulses having a frequency proportional to the amplitude of a direct current signal fed to the input of the operational amplifier through a time delay resistor arranged to effect a charging interval for the feedback capacitor varying with the amplitude of the direct current input signal.

Another object of the invention is to provide in the aforenoted frequency converter network a silicon controlled rectifier arranged to periodically control the discharging of the feedback capacitor and a resetting of a charging circuit for the feedback capacitor, and a level sensor arranged in controlling relation with the silicon controlled rectifier to sense the voltage level at an output of the operational amplifier so that the level sensor, in response to such output voltage, may so control the rectifier as to effect, at the output of the operational amplifier, a series of output voltage pulses having a frequency proportional to the amplitude of the direct current signal applied through the time delay resistor to the feedback capacitor connected between the input and the output of the operational amplifier.

Another object of the invention is to provide in the aforenoted arrangement a voltage level sensor including a resistor and tunnel diode serially connected between an output of the operational amplifier and a ground level so as to sense the level of the amplifier output voltage in relation to ground to render the silicon controlled rectifier conductive so as to discharge the feedback capacitor upon the output voltage level exceeding a predetermined value relative to ground and, in turn, effect a drop in the amplifier output voltage to a level equal to that at the amplifier input and thereupon cause the level sensor to render the silicon controlled rectifier nonconductive to effectively terminate the discharge of the feedback capacitor therethrough and reinitiate a charging cycle for the feedback capacitor so as to thereby periodically effect, at the output of the operational amplifier, a series of voltage pulses having a frequency proportional to the amplitude of the direct current signal applied through the time delay resistor to the input of the operational amplifier and feedback capacitor to cause the level sensor to control the charging and discharging cycles of the feedback capacitor through the operation of the silicon controlled rectifier in response to the pulsating voltage levels at the output of the operational amplifier.

Another object of the invention is to provide a simplified circuit arrangement for converting a direct current signal into a series of pulses having a frequency proportional to the amplitude of the direct current signal in which there is combined with a conventional operational amplifier having a negative feedback capacitor connected between the input and output of the amplifier the novel provision of a silicon controlled rectifier connected across the capacitor to alternately render effective a charging and discharging circuit for the feedback capacitor under control of a voltage level sensor including a tunnel diode and resistor sensitive to the amplitude of an inverted output from the operational amplifier so that the silicon controlled rectifier may be so controlled by the level sensor as to effect, at the output of the operational amplifier, voltage pulses of a frequency proportional to the amplitude of the direct current signal which is applied through a time delay resistor to the input of the operational amplifier and thereby to the feedback capacitor connected between the input and the inverted output of the operational amplifier.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings in which corresponding parts have been indicated by like numerals:

Figure 1:
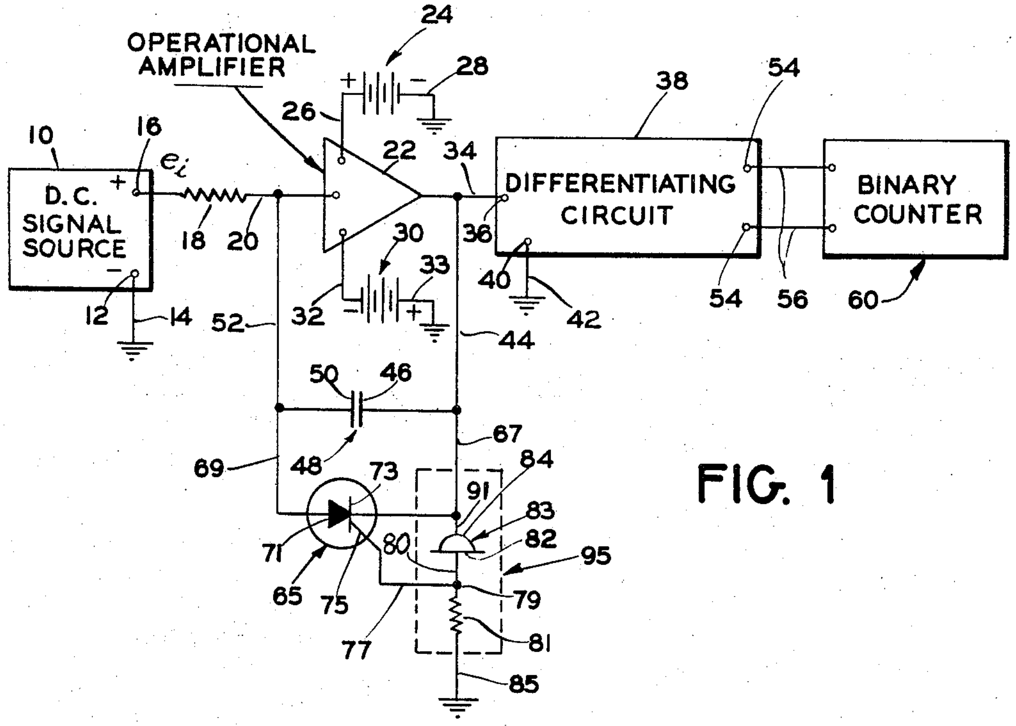
FIGURE 1 is a schematic wiring diagram of a voltage to frequency converter embodying the invention.

Referring to the drawing of FIGURE 1, there is indicated by the numeral 10 a direct current signal source of conventional type and having an amplitude which may be varied by an operator or in accordance with a sensed condition, as is well known in the art.

The direct current signal source 10 has a negative output terminal 12 connected through a conductor 14 to ground and a positive output terminal 16 connected through a resistor element 18 and a conductor 20 to an input of an operational amplifier 22 which may be of a conventional type. As is well known in the art, the operational amplifier 22 includes a source of operating voltage or battery 24 having a positive terminal connected through a conductor 26 to the operating circuitry of the operational amplifier 22 and a negative terminal connected through a conductor 28 to ground and an additional operating voltage source or battery 30 having a negative terminal connected through a conductor 32 to the operating circuitry of the operational amplifier 22 and a positive terminal connected through a conductor 33 to ground.

The operational amplifier 22 may have an output conductor 34 leading to an input terminal 36 of a differentiating circuit of conventional type 38. The differentiating circuit 38 has an input terminal 40 connected to ground through a conductor 42.

The operational amplifier 22 which may be of a conventional type provides an inverted or negative output at the line 34 which is connected through a conductor 44 to one plate 46 of a conventional negative feedback capacitor 48 having an opposite plate 50 connected through a conductor 52 to the line 20 leading to the input of the operational amplifier 22.

Such arrangement of the operational amplifier 22 and negative feedback capacitor 48 is conventional and the operation thereof well known in the art. Furthermore, the differentiating circuit 38 may also be of a well known type having output terminals 54 connected by output conductors 56 to the input of a conventional binary type counter 60 which is also well known in the art.

*Novel control system*

A feature of the present invention resides in the provision of a novel means for alternately controlling the charging and discharging of the negative feedback capacitor 48, particularly in the novel provision of a device operative in one sense for rendering effective a charging circuit for the feedback capacitor 48 and operative in another sense for rendering effective a discharging circuit for the capacitor in response to the voltage level of an inverted output signal from the operational amplifier 22 so as to provide, through the periodic charging and discharging cycles of the feedback capacitor 48, a series of pulses at the output conductor 34 having a frequency proportional to the amplitude of the direct current signal from the source 10 applied across the output terminals 12 and 16 of the direct current source 10 and through the time delay resistor 18 to the input of the operational amplifier 22 and thereby to the feedback capacitor 48 connected across the input line 20 and the output line 34 of the operational amplifier 22.

In the form of the invention shown in FIGURE 1, the control of the discharging circuit for the capacitor 48 and the resetting of the charging circuit for the feedback capacitor 48 is effected by a silicon controlled rectifier 65 connected by conductors 67 and 69 to the plates 46 and 50 of the capacitor 48 through conductors 44 and 52, respectively.

The silicon controlled rectifier 65 operates similarly to a thyratron and passes current from an anode element 71 to a cathode element 73 after a positive going pulse is applied to a gating terminal 75 and while the anode supply voltage applied through conductor 69 is positive.

As shown in FIGURE 1, the cathode element 73 is connected to the conductor 67, while the anode element 71 is connected to the conductor 69. The positive gating pulse for the gating terminal 75 of the silicon controlled rectifier 65 is applied through a conductor 77 leading from the gating terminal 75 to a point 79 on a conductor 80 leading from one end of a resistor 81 to an anode element 82 of a tunnel diode 83 having a cathode element 84. The opposite end of the resistor 81 is connected by a conductor 85 to ground. The cathode element 84 of the tunnel diode 83 is connected by a conductor 91 to the conductor 67.

Figure 2:
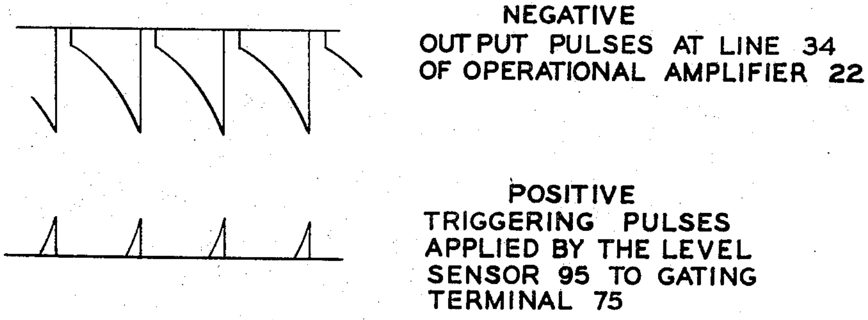
FIGURE 2 is a graphical illustration of the pulses at the output of the operational amplifier in relation to level sensor triggering pulses applied to the gating terminal of the silicon controlled rectifier.

The tunnel diode 83 is thus connected across the ground connection 85 and the negative output line 34 from the operational amplifier 22 by the resistor 81 and the conductors 44, 67 and 91 so as to provide a level sensor indicated generally by the numeral 95 which controls the positive bias or level sensor control pulses indicated graphically at FIGURE 2 and applied through the control line 77 to the gating terminal 75 of the silicon controlled rectifier 65.

It will be seen, then, that the direct current signal applied through the resistor 18 to the input line 20 of the operational amplifier 22 causes the plate 50 of the negative feedback capacitor 48 to be positively charged while a negative ramp voltage appears at the output line 34 from the operational amplifier 22 so that the opposite plate 46 of the feedback capacitor 48 connected thereto through the conductor 44 is negatively charged.

When the inverted amplified output at the conductor 34 of the operational amplifier 22 due to the biasing effect of the battery 30 becomes sufficiently negative with respect to the grounded conductor 85, the voltage drop across the tunnel diode 83 switches sharply from a low voltage drop to a high voltage drop. This is an operational characteristic of a tunnel diode which is well known in the art and has been utilized in the tunnel diode 83 to trigger the operation of the silicon controlled rectifier 65 to effect the desired operation, as hereinafter explained.

Thus, the aforenoted increase in the voltage drop across the tunnel diode 83 is effective at a predetermined voltage level at the output line 34 of the operational amplifier 22 to apply a positive going triggering or gating pulse through the control line 77 to the gating terminal 75 effective to fire the silicon controlled rectifier 65. The firing of the silicon controlled rectifier 65, in turn, closes a shunting circuit across the capacitor 48 from the line 69 to the line 67 which causes the positively charged plate 50 of the capacitor 48 to discharge through the silicon controlled rectifier 65 to the negatively charged plate 46.

During such discharge of the capacitor 48, the voltage applied at the input line 20 is, in turn, applied through the silicon controlled rectifier 65 and the conductors 52, 69, 67 and 44 to the output conductor 34 so that the level of the output voltage at the conductor 34 becomes substantially the same as that of the input voltage at the conductor 20, whereupon the tunnel diode 83 switches from the high voltage drop across it to a low voltage drop across it, whereupon the bias applied to the gating terminal 75 becomes such as to return the silicon controlled rectifier 65 to a nonconductive state, discontinuing the discharging circuit for the capacitor 48 and reinitiating the charging cycle for the capacitor 48. The negative electrical output pulse appearing at the line 34 is thereupon terminated with a sharp positive going wave front, as shown graphically in FIGURE 2, upon the initiation of the discharging action of the capacitor 48 through the silicon controlled rectifier 65 by the triggering pulse applied by the level sensor 95. Thereafter, upon the termination of the triggering pulse applied to the gating terminal 75, the negative output pulse at the line 34 once again starts to build up with the charging action of the capacitor 48, as indicated graphically at FIGURE 2.

In the voltage to frequency converter, the circuit of FIGURE 1 has been found to have certain marked advantages in that it is capable of greater linearity, has a wide dynamic range (1000:1), and has marked circuit simplicity, in that it may be readily implemented with microcircuits and has a single capacitor control of frequency range.

Operation of the disclosed circuit may be further explained in that the application of the direct current positive signal to the terminal 16 of FIGURE 1 causes the capacitor 48 to be charged through the time delay resistor 18 at a rate proportional to the amplitude of the input direct current signal. This proportionality is due to the action of the operational amplifier 22 as controlled by the novel circuitry herein provided. Thus, the negative feedback from the output conductor 34 of the operational amplifier 22 by the capacitor 48 tends to drive the input terminal 20 of the operational amplifier to ground potential, yet, in doing this, the operational amplifier 22 tends to draw no appreciable current from the circuit at the input conductor 20. The current drawn then by the capacitor 48 is substantially equal to the current drawn through the time delay resistor 18, since the operational amplifier 22 draws no appreciable current. The current drawn through the time delay resistor 18 then is equal to the direct current signal from the source 10 divided by the resistance R of the resistor 18, since the terminal 20 is held substantially at ground potential by the action of the operational amplifier 22. Therefore, the following equations apply and show that the rate of change of the charge of the capacitance C (defined as $de_c/dt$) of the capacitor 48 is proportional to the amplitude of the direct current signal $e_i$ at the input conductor 20 (R and C being constants):

$$\frac{de_c}{dt}=\frac{1}{C}(i_C)$$

true for any capacitor but $$i_C=i_R=\frac{e_i}{R}$$

because of amplifier action hence $$\frac{de_c}{dt}=\left(\frac{1}{CR}\right)(e_i)Q.E.D.$$

The remainder of the control circuit and novel feature of the disclosed voltage to frequency converter network includes a capacitor charging and discharging control device 65 and the level sensor 95 operatively arranged so as to so control the feedback capacitor 48 as to cause a pulse output to appear at the output line 34 having a frequency proportional to $e_i$, the amplitude of the direct current applied across the terminals 12 and 16 of the direct current signal source 10.

In order to further illustrate the novel operation of the voltage to frequency converter, it may be assumed again that a constant amplitude of positive signal voltage $e_i$ is applied at terminal 16 of FIGURE 1, causing the capacitor 48 to charge at a constant rate through the time delay resistor 18. At any time, this voltage across the capacitor 48 also appears across the series combination of tunnel diode 83 and resistor 81, since the input conductor 20 leading to the operational amplifier 22 is always held substantially at ground potential by the operational amplifier 22, as heretofore explained.

The tunnel diode 83 is so selected as to have an operational characteristic such that the voltage drop across the tunnel diode 83 first remains very low so as to keep the silicon controlled rectifier 65 (whose input gating terminal 75 and cathode element 73 are connected across the tunnel diode 83) in a nonconductive state. Finally, when the current flow through the resistor 81 and tunnel diode 83 builds up to a value sufficient to trigger the tunnel diode 83 so as to effect a high voltage drop across the tunnel diode 83, due to the selected operational characteristic thereof, the silicon controlled rectifier 65 is thereupon gated into a conductive state in response to the positive going pulse applied to the gating terminal 75 causing the anode 71 to conduct to the cathode element 73. The silicon controlled rectifier 65 then remains in a conductive state until it has discharged the capacitor 48 sufficiently to turn the silicon controlled rectifier 65 off and return it to a nonconductive state. The capacitor 48 is thereupon free to recharge and the cycle repeats.

Since the input terminal 20 to the operational amplifier 22 is held substantially at ground level by the amplifier feedback action of the capacitor 48, these changes of potential across the capacitor 48 also appear at the output conductor 34 of the operational amplifier 22. The relatively rapid discharge of the capacitor 48 further produces a steep positive-going wave front to the negative pulses at the conductor 34, as shown graphically in FIGURE 2, which may be used to trigger external equipment through the action of the differentiating circuit 38 and binary counter 60, of a type well known in the art. Also, since the capacitor 48 discharges at a relatively constant rate (due to amplifier action), the resulting rise of potential at the conductor 34 is at a constant rate, so that a simple resistance and capacitance differentiating circuit 38 connected to the output conductor 34, as shown in FIGURE 1, will produce in its output 54 a convenient rectangular pulse for operating a conventional binary counter 60.

That this output pulse train has a frequency proportional to the positive signal voltage $e_i$ may be seen from the following: Assuming that a constant amplitude of positive signal voltage $e_i$ is applied at the positive terminal 16 of FIGURE 1, the capacitor 48 having a capacitance C will charge through the time delay resistor 18 at a constant rate finally reaching in a time T a voltage level $E_T$, sufficient to trigger the action of the level sensor 95 to effect a discharge of the feedback capacitor 48 through the control device 65. Since the discharge time $t_d$ of capacitor 48 through the device 65 can be assumed negligible compared to the charge time T of the capacitor 48 through the time delay resistor 18, the time space of the pulses at the output conductor 34 will be substantially equal to the time T. The following equations apply and show that the frequency of the output pulse train is proportional to the amplitude of the signal voltage $e_i$:

$$E_T=\int_0^T\left(\frac{de_c}{dt}\right)dt \quad \text{(Charging of capacitor 48 having capacitance } C \text{ to a fixed triggering level, } E_T)$$

$$=\frac{e_i}{CR}\int_0^T(dt) \quad \text{(Assuming } e_i \text{ is a constant)}$$

$$=\frac{e_i}{CR}(T)=\frac{e_i}{CR}\left(\frac{1}{f}\right)$$

Hence, $$f=\left(\frac{1}{CRE_T}\right)(e_i)Q.E.D.$$

When $e_i$ is not constant over a period of one cycle, there results a frequency proportional to the average of $e_i$ over a cycle of output. When $e_i$ has a negative or positive value instead of a positive value, the circuit may be doubled up, as shown in FIGURE 3, to get an output frequency for either signal polarity without changing the theory of operation.

Figure 3:
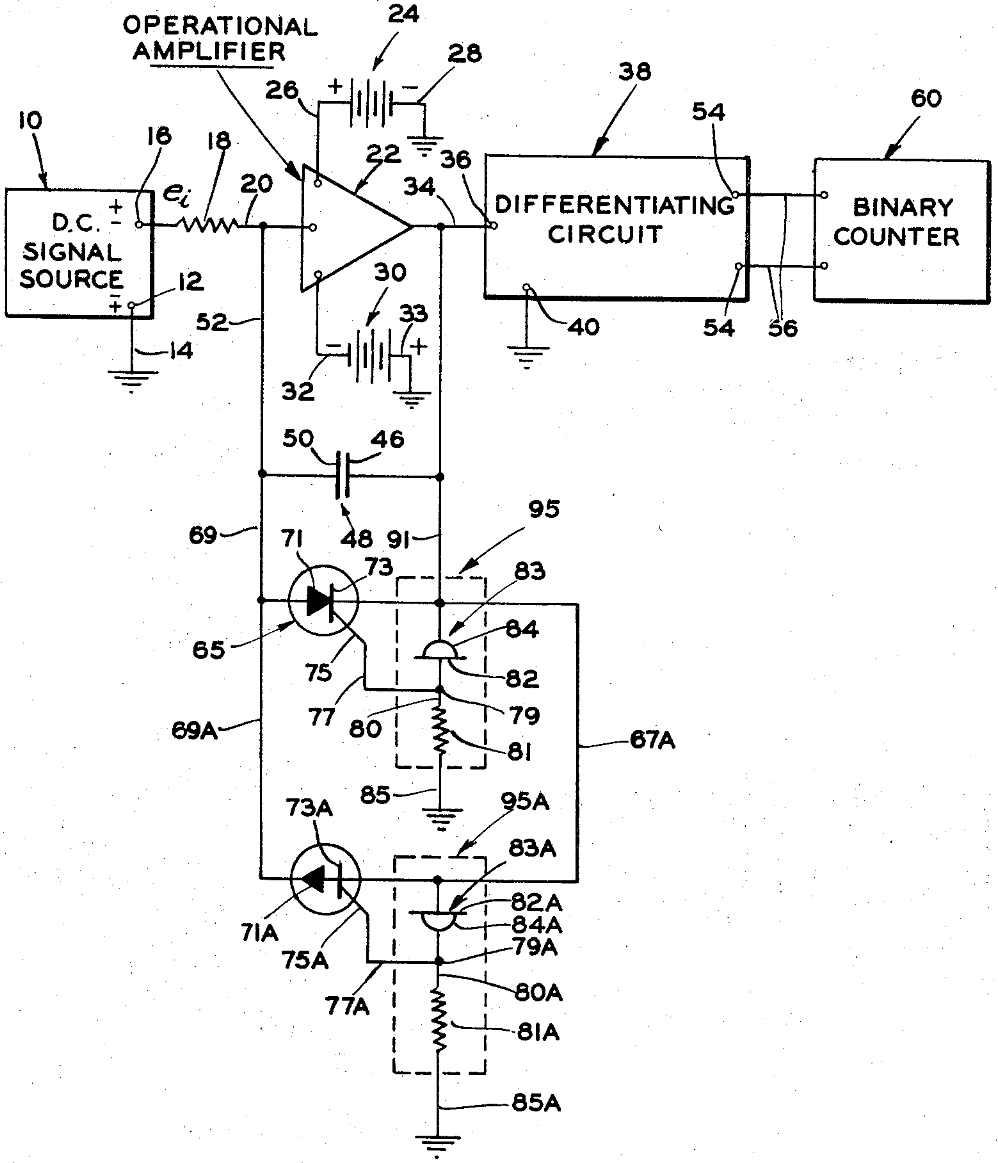
FIGURE 3 is a schematic wiring diagram of a modified form of the voltage to frequency converter of FIGURE 1 in which the novel control circuitry has been arranged to provide an output pulse signal of a frequency proportional to the amplitude of an input direct current signal having either a positive or negative signal polarity without changing the theory of operation thereof.

The operation of the voltage to frequency converter circuit of FIGURE 3 is essentially the same as that in FIGURE 1 with the corresponding parts for effecting operation of the discharge and charging control device 65A and the level sensing device 95A, when $e_i$ has a negative instead of a positive value, indicated by corresponding numerals to which the suffix A has been applied and no further detailed explanation thereof is deemed necessary at this time.

While two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. Means for converting a variable amplitude direct current signal into a pulsating signal of a frequency proportional to the amplitude of the direct current signal, said converting means comprising:

means for amplifying said direct current signal, said amplifying means including an input and an output;

a negative feedback capacitor;

means for connecting the negative feedback capacitor between the input and the output of the amplifying means so as to apply an inverted amplified signal from said output to said input of the amplifying means;

a resistor for connecting the direct current signal to the input of the amplifier means and to said negative feedback capacitor so as to effect a delay in a charging of said capacitor by said direct current signal;

a control device connected across the negative feedback capacitor and including gating means having a silicon controlled rectifier including control means;

means for operating the control device being connected to the control means and including a voltage sensor responsive to the signal at the output of the amplifier means when said output signal is above a predetermined level for providing a first controlling output to render the control means effective to close the gating means to provide a shunting circuit for the negative feedback capacitor, said first controlling output thereby causing the control device to effect a discharge cycle for said capacitor so as to decrease the level of the amplifier output, said operating means being responsive to said output signal at a decreased level to provide a second controlling output to cause the control device to open the shunting circuit so as to thereby render effective a charging cycle for said capacitor; and the periodic charging and discharging cycles for the negative feedback capacitor effecting at the output of the amplifying means a series of electrical pulses having a frequency proportional to the amplitude of the direct current signal.

2. The combination defined by claim 1, including:

the silicon controlled rectifier included in the gating means being connected between the input and output of said amplifier means;

the voltage sensor having a resistor and a tunnel diode serially connected at the output of said amplifier means; and means for connecting the control means of the silicon controlled rectifier intermediate said serially connected resistor and tunnel diode so that said control element renders said silicon controlled rectifier conductive to effect the discharging circuit for the capacitor upon the output voltage exceeding said predetermined voltage.

3. The combination defined by claim 1 in which said voltage sensor includes a resistor and a tunnel diode serially connected at the output of said amplifier means to sense the voltage of the output signal, and means connecting said control means of said gating means across the tunnel diode to render said control means effective for causing the gating means to provide the shunting circuit for the capacitor upon the output signal exceeding said predetermined voltage.

4. In combination with a variable amplitude direct current source, means for converting a direct current signal supplied by said source into a pulsating signal of a frequency proportional to the amplitude of the direct current signal, said converting means comprising:

an operational amplifier including an input and an output;

a negative feedback capacitor;

means connecting the negative feedback capacitor between the output and input of said operational amplifier;

a resistor for connecting the direct current signal from said source to the input of the operational amplifier, said resistor effecting a time delay in a charging of said negative feedback capacitor by the direct current signal supplied from said source and applied through said operational amplifier;

a gating means operatively connected across said negative feedback capacitor and including a silicon controlled rectifier having means for controlling the conduction thereof and connected between the input and output of said operational amplifier, said gating means including control means operative in one sense to render the gating means conductive to effect a discharging circuit for the capacitor and operative in another sense to render said gating means nonconductive so as to render the charging of said capacitor effective;

means responsive to the charge applied to said capacitor by the direct current signal source and through the operational amplifier for selectively operating said control means in said senses and including a resistor and a tunnel diode serially connected between the output of said operational amplifier and an output of said direct current signal source to sense a difference in voltages at said outputs;

the conduction controlling means of the silicon controlled rectifier being operatively connected across the tunnel diode so as to render the silicon controlled rectifier conductive upon the voltages at said outputs exceeding a predetermined differential value, said control means thereupon rendering said silicon controlled rectifier periodically effective to complete the discharging circuit for the capacitor and reduce the voltage at the output of the operational amplifier to a value equal to the voltage at the output of the direct current source; and the periodic charging and discharging cycles for the negative feedback capacitor effecting at the output of the operational amplifier means a series of electrical pulses having a frequency proportional to the amplitude of the direct current signal supplied by said source.

5. In combination with a variable amplitude direct current signal source, means for converting a direct current signal supplied by said source of varying polarity and amplitude into a pulsating signal of a frequency proportional to the amplitude of the direct current signal, said converting means comprising:

an operational amplifier including an input and an output;

a negative feedback capacitor;

means connecting the negative feedback capacitor between the output and the input of said operational amplifier so as to apply an inverted amplified signal from said output to said input of the operational amplifier;

a resistor for connecting the direct current signal from said source to the input of the operational amplifier, said resistor effecting a time delay in a charging of said negative feedback capacitor by the direct current signal supplied from said source and applied thereto through said operational amplifier;

a first and second gating means operatively connected in opposite senses across said negative feedback capacitor, each of said first and second gating means including a silicon controlled rectifier, said silicon controlled rectifiers being connected in opposite current conducting senses between the input and output of said operational amplifier;

a selective operating means including a first resistor and a first tunnel diode serially connected in one current conducting relation between the output of said operational amplifier and an output of the direct current signal source, and a second resistor and a second tunnel diode serially connected in an opposite current conducting relation between the output of said operational amplifier and said output of the direct current signal source;

the first and second resistors and tunnel diodes being so connected in opposite current conducting relation so as to sense a difference in voltages at said outputs of opposite polarity;

each of said silicon controlled rectifiers being normally nonconductive and including control means for selectively effecting the conduction thereof and each of said conduction controlling means being operatively connected across one of said tunnel diodes so as to render the rectifier controlled thereby effective in the current conductive sense thereof upon the voltages at said outputs exceeding a predetermined differential value and being of the predetermined polarity to effect such conduction; and said conduction controlling means thereupon selectively rendering the controlled rectifier periodically effective to complete a discharging circuit for the capacitor and reduce the voltage at the output of the operational amplifier to a value equal to that of the voltage at the output of the direct current signal source.

References Cited

UNITED STATES PATENTS

| | | | |
|---|---|---|---|
| 3,022,469 | 2/1962 | Bahrs et al. | 332—14 |
| 3,040,273 | 6/1962 | Boff | 332—14 |
| 3,064,208 | 11/1962 | Bullock et al. | 332—9 |
| 3,168,658 | 2/1965 | Marshall | 307—88.5 |
| 3,170,124 | 2/1965 | Candilis | 331—111 |
| 3,245,004 | 4/1966 | Anderson et al. | 332—9 |
| 3,274,501 | 9/1966 | Heinsen | 328—127 |

ARTHUR GAUSS, *Primary Examiner.*

S. D. MILLER, *Assistant Examiner.*